United States Patent [19]

Sawko et al.

[11] 4,088,806

[45] May 9, 1978

[54] INTUMESCENT-ABLATOR COATINGS USING ENDOTHERMIC FILLERS

[75] Inventors: Paul M. Sawko; Salvatore R. Riccitiello, both of San Jose, Calif.

[73] Assignee: The United States of America as represented by the Administrator of the National Aeronautics and Space Administration, Washington, D.C.

[21] Appl. No.: 753,964

[22] Filed: Dec. 23, 1976

[51] Int. Cl.$^2$ .................. B32B 15/08; C08K 5/01; C08K 5/02
[52] U.S. Cl. .................. 428/332; 260/33.6 EP; 260/33.6 PQ; 260/33.8 EP; 260/33.8 UA; 260/37 EP; 260/42.43; 260/45.7 R; 260/45.75 W; 260/45.85 N; 260/45.9 R; 427/386; 427/388 A; 428/313; 428/921
[58] Field of Search ............ 260/33.6 EP, 33.6 PQ, 260/33.8 EP, 33.8 UA, 37 EP, 45.7 R, 45.7 RL, 45.75 W, 45.85 N, 45.9 R, 42.43; 428/313, 314, 332, 921

[56] References Cited

U.S. PATENT DOCUMENTS

| 3,663,463 | 5/1972 | Wren ........................... 260/DIG. 24 |
| 3,730,940 | 5/1973 | Versnel et al. ................ 260/45.9 R |
| 3,730,942 | 5/1973 | Green et al. .................. 260/45.9 R |
| 3,779,825 | 12/1973 | Blackwell ...................... 149/19.1 |
| 4,000,109 | 12/1976 | Smith et al. ................. 260/45.75 W |

OTHER PUBLICATIONS

Lee et al. — Handbook of Epoxy Resins (McGraw-Hill) (N.Y.) (1967), pp. 24-29 to 24-33 and 25-31.

Primary Examiner—Donald E. Czaja
Assistant Examiner—H. H. Fletcher
Attorney, Agent, or Firm—Darrell G. Brekke; John R. Manning; Armand McMillan

[57] ABSTRACT

An intumescent-ablator coating composition which comprises an intumescent agent such as the ammonium salt of 1,4-nitroaniline-2-sulfonic acid or 4,4-dinitrosulfanilide, a polymeric binder system and about 5 to 30% by weight, based on the total weight of the intumescent agent and the binder, of an endothermic filler having a decomposition temperature about or within the exothermic region of the intumescent agent.

10 Claims, 5 Drawing Figures

INTUMESCENT-ABLATOR COATINGS USING ENDOTHERMIC FILLERS

ORIGIN

The invention described herein was made by employees of the U.S. government and may be manufactured and used by or for the government for governmental purposes without the payment of any royalties thereon or therefor.

BACKGROUND OF THE INVENTION

Field Of The Invention

The present invention relates to an intumescent composition which forms an intumescent-ablator coating which provides an increased level of thermal protection to substrates upon which it is coated. More particularly, the present invention relates to an intumescent coating which is tough and environmentally stable, which yields an insulative char and which contains inorganic fillers which provide endothermically decomposing products.

Background Of The Invention

Intumescent coating compositions in the past have been prepared by combining an intumescent agent with a suitable polymeric binder system. When such a coating is heated to the temperature at which the agent intumesces, the coating expands to many times its original volume thereby forming a charred layer which provides a protective barrier from flame and heat. Among the conventional intumescent compositions are those which contain salts of nitroaromatic amines such as the ammonium salt of 4-nitroaniline-2-sulfonic acid and 4,4'-nitrosulfanilide. Another series of intumescent coating compositions are those which contain phosphate derivatives as intumescent agents. These derivatives form an acid which reacts with a carbon containing material. A low melting resin is required as a binder to allow the special blowing agents to release gases at the decomposition temperature when the coating is exposed to heat or fire. All of the conventional intumescent compositions require heat or fire to activate the intumescent process. In the case of the nitroaromatic amine intumescent agents, this process occurs at relatively high temperature and is highly exothermic because of the nature of the reactions, a rapid rise in temperature of from room temperature to about 400° C occurs in the uncoated or backface side of the coated substrate. This rapid temperature rise provides, without a specific temperature level, times of only one to five minutes control and thus is detrimental from the viewpoint of low temperature, short time, duration protection of the coated substrate. Moreover, some of the prior art intumescent compositions, notably those based on ammonium phosphate and salts of nitroaromatic amines such as p-nitroaniline bisulfate and the ammonium salt of 1,4-nitroaniline-2-sulfonic acid possess environmental stability problems and thus only afford limited environmental protection.

Several techniques have been developed in the past for protecting various substrates from the ravages of heat. One technique involves the incorporation of a sublimation agent in paints which are coated on a substrate (R. Feldman, ACS Organic Coatings and Plastics Chemistry Preprints, 33 (1), 1973). These fire retardant paints, however, are essentially non-intumescing materials which form a porous layer of debris by the release of cooling gases during sublimation. Another prior art fire retardant formulation employs an endothermic compound such as alumina hydrate which diminishes smoke generation as well as reduces flammability by absorbing the heat from the source of fire.

A need, therefore, continues to exist for a method by which the rapid temperature rise caused by the onset of exothermic intumescense in an intumescent coating on a substrate can be reduced or eliminated.

SUMMARY OF THE INVENTION

Accordingly, one object of the present invention is to provide an intumescent-ablative coating composition for substrates which is environmentally stable and which, upon intumescense, lessens the rapid rise in backface temperature of the substrate.

Briefly, this object and other objects of the present invention as hereinafter will become more readily apparent can be attained by an intumescent-ablator composition which comprises the admixture of an endothermic filler with an intumescent composition of an intumescent agent and a binder system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
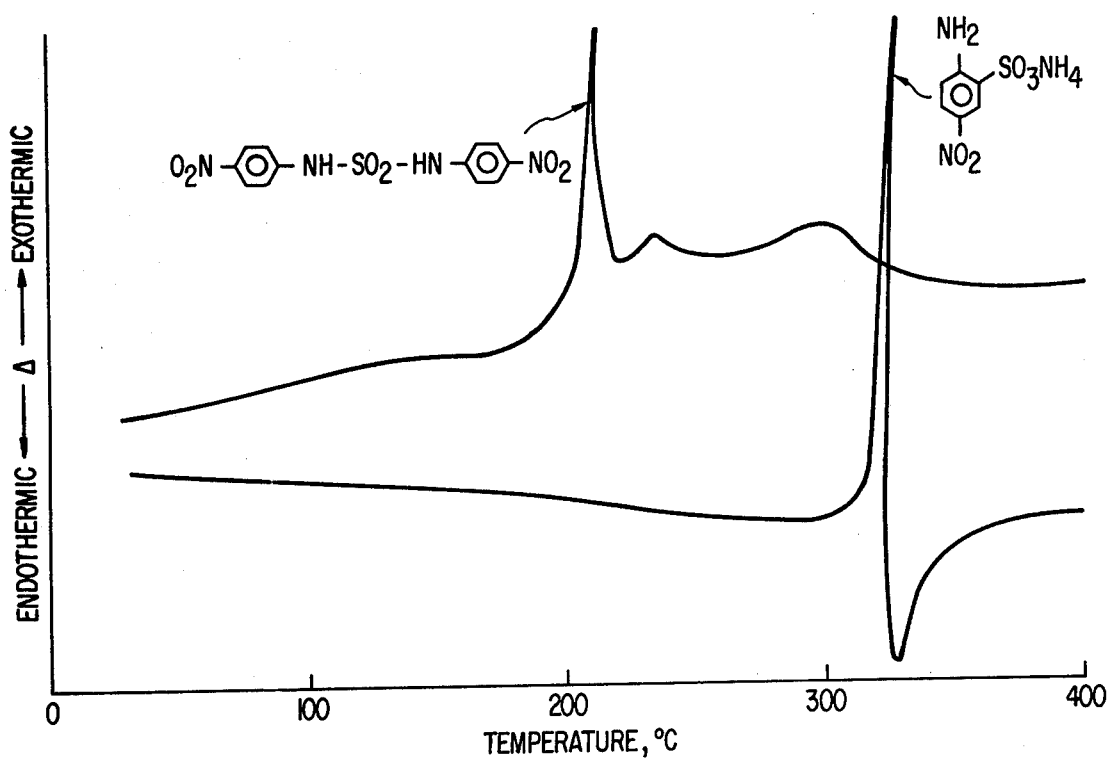
FIG. 1 shows the differential thermal analysis curves of the intumescent agents, 4,4'-dinitrosulfanilide and the ammonium salt of 1,4-nitroaniline-2-sulfonic acid.

It has now been found that the low temperature, short time thermal protection of substrates coated with an intumescent formulation can be improved by incorporating certain inorganic fillers which possess endothermic decomposition characteristics at certain temperatures into the intumescent formulation. The formulation provides an intumescent coating which forms a tough, insulative char upon intumescence and which provides improved thermal control on the backface or uncoated side of a substrate at specific temperature regions of the substrate because of the endothermic characteristics of the fillers. In the past ablative coatings or coatings which provide a substrate with protection from heat but at the same time are thermally destructable, have been prepared containing these fillers. However, these fillers have not been used in the formulation of intumescent compositions to modify the thermal characteristics of such compositions upon intumescence.

The modification of the insulative characteristics of an intumescent coating by the presence of an endothermic filler is based upon a set of complex physical and chemical processes which occur during intumescence in which an insulative char is formed which protects a coated substrate. A semiempirical mathematical model has been developed to demonstrate the effectiveness of the thermal protection characteristics of intumescent coatings. The model takes into account the heating environment in which conduction, heat from exothermic reactions and convection from the pyrolytic gases produced are considered.

A sequence of events is believed to occur in the protection of a substrate coated with an intumescent layer. As heat is applied to a protected substrate, energy is absorbed by the surface coating until the intumescent or decomposition temperature of the coating is attained and intumescence is initiated. As the process proceeds, a pyrolysis zone is generated in which hot gases, which are generated by the decomposition reactions which occur, percolate outward thus forming an intumesced foam. The exothermic reaction which occurs in the pyrolysis zone causes the coated layer to direct more energy to the substrate than is conducted through the expanding intumescent char. Even though some transpirational cooling of the coating occurs as a result of transport of the gases, the exothermic reaction in the pyrolysis zone causes an increase in the temperature of the substrate being protected. In other words, the presence of an endothermic filler in the intumescent composition of the present invention provides a means of dissipating the thermal energy released in the intumescent layer coated on a substrate, thereby decreasing the backface temperature of a coated substrate, i.e. the temperature of the uncoated side of the substrate.

The types of intumescent compositions with which the endothermic fillers of the present invention can be combined are not critical. The endothermic fillers can be combined with any conventional intumescent composition. Preferred embodiments of compatible, base intumescent compositions include a system containing the ammonium salt of 1,4-nitroaniline-2-sulfonic acid dispersed in an epoxy/polysulfide binder system as disclosed in U.S. Pat. No. 3,663,464, and a system disclosed in a copending U.S. patent application Ser. No. 734,902, filed on Oct. 22, 1976, authored by P. M. Sawko and S. R. Riccitiello containing 4,4'-dinitrosulfanilide as the intumescent agent in a binder system of an epoxy resin and a carboxy-terminated chlorinated polyolefin with an amine terminated butadiene-acrylonitrile rubber as a hardener for the epoxy component. These references are incorporated herein by reference. A particularly preferred base intumescent composition comprises from 20 to 70 weight percent of 4,4'-dinitrosulfanilide, from 0.5 to 2.0 weight percent of bisphenol A epoxy having the formula:

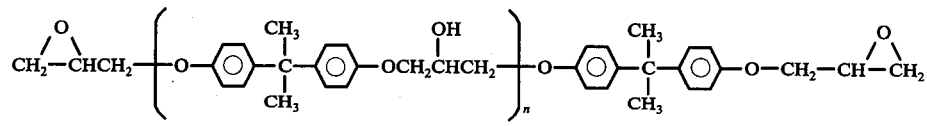

wherein n has a value such that the epoxy compound has a viscosity of 100–160 poises and an epoxide equivalent weight of 185–192, an amount of an amine hardener sufficient to cross-link and harden the epoxy and having the formula:

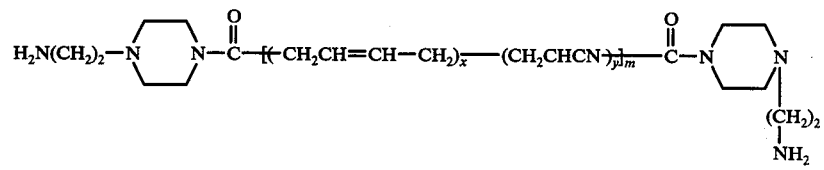

wherein $x = 5$, $y = 1$ and $m = 10$ and from 15–60 weight percent of a carboxy-terminated chlorinated polyolefin having the formula:

wherein $y/x$ provides a chloride content of 58–62 weight percent. Another preferred base intumescent composition consists of a combination of the ammonium salt of 1,4-nitroaniline-2-sulfonic acid and an epoxypolysulfide binder.

All of the intumescent compositions containing the ablative filler impart substantially improved thermal protection to a coated substrate. The fillers which are added to the intumescent compositions decompose endothermically thus contributing substantially to extending the time to reach a backface temperature on a coated substrate. Thus, the compositions of the present invention function as intumescent/ablative compositions. The fillers do not adversely effect the desirable functional properties of the intumescent coatings such as adhesion, toughness and environmental stability. Moreover, the fillers provide decomposition products, such as boron containing substances, which can react with the intumescent residues, thus providing the intumescent composition with oxidative stability.

The type of filler which is employed in the present composition is not critical. It is only important that the fillers possess endothermic characteristics and decompose at a temperature about or within the exothermic region of the intumescent agent in the intumescent composition. It is desirable that the filler should not be water soluble because a significantly water soluble filler would adversely affect the stability characteristics of the resulting composition. Suitable examples of endothermic fillers include potassium fluoborate, ammonium fluoborate, zinc borate, ammonium oxalate, lead carbonate, and mixtures thereof. Surprisingly, it has been found that hydrated alumina, which is used in many heat and fire resistant compositions, does not function as an acceptable endothermic filler in the present composition.

A factor which influences the amount of endothermic filler which is admixed with the intumescent composition is that it is advantageous to add as much filler as possible in order to compensate for the exothermicity of the decomposition of the intumescent agent. Indeed, the amount of filler needed to completely counterbalance the exothermic properties can be calculated. In practice, however, it is impossible to add enough filler to fully counterbalance the heat evolved upon degradation of the intumescent agent without adversely affecting the properties of the composition. Thus in determining the amount of filler to be incorporated in a particular intumescent composition, the only important considerations are that the amount of filler selected should not degrade or result in the deterioration of the physical characteristics of the resultant intumescentablator composition, and should not interfere with the intumescent characteristics of the intumescent agent. Normally, from about 5 weight percent to 30 weight percent of the filler is incorporated in the base intumescent composition. With regard to specific filler materials no more than 30 weight percent ammonium oxalate hydrate, no more than 15 weight percent potassium fluoborate and zinc borate and no more than 10 weight percent ammonium fluoborate can be used as a filler in an intumescent composition without loss of film-forming properties or intumescence. Two or more fillers can be used in combination and a particularly preferred combination is zinc borate and ammonium oxalate which provides the broadest range of endotherm characteristics, i.e., 125° to 250° C, which completely encompasses the exothermic decomposition range of 4,4'-dinitrosulfanilide.

The intumescent/ablative composition of the present invention is prepared simply by mixing the filler with the components of an intumescent composition dispersed in a solvent. In fact, the preparation of the complete composition is essentially dictated by the method used to prepare the basic intumescent composition. Since in some intumescent compositions, two part mixtures are initially prepared in which one mixture contains the intumescent agent and polymeric binder dispersed in a solvent and the other mixture contains a hardener or cross-linking agent for a component of the binder system dispersed in a solvent, the desired amount of filler can be added to either mixture, preferably the intumescent agent containing component, prior to blending both mixtures to complete the formulation of the intumescent/ablative composition. The filler can be admixed with the components of the composition by any suitable mixing or dispersing technique. The intumescent/ablative composition is prepared generally under ambient temperature and pressure conditions. Suitable solvents which are employed for the preparation of the present composition must be compatible with all components of the composition and include aromatic hydrocarbon solvents such as benzene, toluene, xylene and the like; and chlorinated compounds such as methylene chloride. The amount of solvent used in not critical.

A method of preparing the intumescent composition of the present invention is illustrated by the use of a base intumescent composition containing 4,4'-dinitrosulfanilide as the intumescent agent combined with an endothermic filler. The base composition is prepared by forming a dispersion of 4,4'-dinitrosulfanilide and the desired amount of endothermic filler in a binder system of a carboxy-terminated chlorinated polyolefin and an epoxy resin in the presence of a solvent, and by separately dissolving a hardener of an amine terminated butadiene-acrylonitrile rubber in a solvent. The intumescent composition is then prepared by combining the hardener solution with the other liquid component as set forth in the copending application Ser. No. 734,902, filed on Oct. 22, 1976.

The present intumescent-ablator composition can be applied to any suitable substrate by any convenient means. Suitable substrates are those which do not decompose below the intumescent temperature of the present invention and include such metals as steel, aluminum and the like; plastics, wood, cardboard and the like. The present composition is therefore, especially applicable in protecting metal parts which potentially could be exposed to heat or fire such as in aircraft, spacecraft and the like.

The intumescent composition can be applied by any satisfactory coating technique to a desired substrate by brushing, spraying, or the like. Once hardened, the coatings dry to tough adherent films which are resistant to high humidity environments. The coatings normally dry to film thicknesses of 20 to 100 mils, preferably 30 to 70 mils and when heated or exposed to fire, function as intumescent, ablative, thermal protective coatings. The coatings which are applied expand or intumesce by a factor of 10 to 30 times the original coating thickness and form a tough, uniform, insulating char or residue which protects the substrate from heat or flames.

Having generally described this invention, a further understanding can be obtained by reference to certain specific examples which are provided herein for purpose of illustration only and are not intended to be limiting unless otherwise specified.

EXAMPLES 1-4

Referring to Table 1 a dispersion designated as Part A containing an intumescent agent was prepared by dispersing each ingredient in the amount indicated in a kinetic dispersion unit, i.e., a Kady Mill-Model L, for 20 minutes or in a ball mill for four hours. A solution designated as Part B containing an amine hardener and an endothermic filler as set forth in Table 1 was separately prepared. Parts A and B were mixed and the resulting composition was sprayed or brushed on a steel substrate and allowed to air dry to form a tough, adherent coating resistant to the environment. The abrasion resistance of Examples 1 and 3 were determined by abrading the coatings on a Taber Abrader for 1000 cycles and a 500 gm weight using a CS-10 wheel. Weight losses of 111 mg and 119 mg were obtained from Examples 1 and 3 in contrast to a weight loss of 119 mg for the base composition free of endothermic filler.

TABLE 1

| Ingredients | Base Composition | 1 | 2 | 3 | 4 |
| --- | --- | --- | --- | --- | --- |
| Part A | | | | | |
| 4,4'-dinitrosulfanilide | 23.20 | 23.20 | 109.20 | 23.20 | 83.50 |
| carboxy-terminated Chlorinated polyolefin | 28.30 | 28.30 | 128.00 | 28.30 | 97.80 |
| epoxy resin | 0.85 | 0.85 | 4.00 | 0.85 | 3.5 |
| Toluene | 15.90 | 15.90 | 104.00 | 15.90 | 78.15 |
| xylene | 13.50 | 13.50 | — | 13.50 | 48.90 |
| methylene chloride | 12.80 | 12.80 | — | 12.80 | 55.00 |
| potassium fluoborate | — | 5.40 | — | — | — |
| ammonium fluoborate | — | — | 25.20 | — | — |
| zinc borate | — | — | — | 5.40 | 19.3 |
| ammonium oxlate | — | — | — | — | 45.0 |
| Part B | | | | | |
| Amine terminated butadiene acrylonitrile rubber | 3.40 | 3.40 | 16.00 | 3.40 | 14.25 |
| Toluene | 3.40 | 3.40 | 16.00 | 3.40 | 14.25 |

The compositions of Examples 1-4 were coated on cold rolled steel panels of the following dimensions: 7.62 cm × 7.62 cm × 0.159 cm. The center of each panel had a 2.54 cm diameter hole into which was cemented a 2.36 cm diameter × 0.159 cm thick cold rolled steel disc with an epoxy-novolac/polyimide adhesive (60/40). The time-temperature profile of each panel was obtained at a heat flux of 110-120 kilowatts/m² using a thermocouple attached to the backside or uncoated side of the calorimetric disc. The times to reach specific backface temperatures were recorded for each example and the base composition as shown in Table 2.

TABLE 2

| Backface Temperature °C | Base Composition | Time, Seconds EXAMPLE |  |  |  |
|---|---|---|---|---|---|
|  |  | 1 | 2 | 3 | 4 |
| 50 | 15 | 15 | 15 | 15 | 20 |
| 100 | 50 | 45 | 50 | 50 | 80 |
| 150 | 110 | 90 | 140 | 120 | 200 |
| 200 | 170 | 170 | 200 | 200 | 230 |
| 250 | 195 | 220 | — | — | — |
| Average Coating Thickness, mils | 62 | 53 | 58 | 65 | 68 |

EXAMPLES 5 AND 6

Another intumescent composition of the present invention was formed by mixing ammonium oxalate as an endothermic filler in a base intumescent composition containing the ammonium salt of 1,4-nitroaniline-2-sulfonic acid dispersed in a polysulfide and epoxy binder system as described in Table 3. The preparation of the base intumescent composition is described in U.S. Pat. No. 3,663,464. The base and filler containing compositions were prepared as described in Examples 1-4 and sprayed and tested thermally on coated steel substrates. The improved thermal protection of the filler containing composition over a temperature range of up to 200° C is shown in Table 4.

TABLE 3

| Ingredients | EXAMPLE 5 Base Composition | Example 6 |
|---|---|---|
| Part A |  |  |
| Polysulfide | 14.1 | 10.8 |
| 1,4-nitroaniline-2-sulfonic acid ammonium salt | 57.0 | 36.2 |
| Methyl ethyl ketone | 28.9 | 45.3 |
| Ammonium Oxalate | — | 7.7 |
|  | 100.0 | 100.0 |
| Part B |  |  |
| Epoxy | 14.1 | 10.8 |
| Toluene | 4.8 | 3.6 |
|  | 18.9 | 14.4 |
| Part C |  |  |
| Tris-(dimethylaminomethyl)phenol | 2.8 | 2.2 |
| Toluene | 2.8 | 2.2 |
|  | 5.6 | 4.4 |

TABLE 4

| Backface Temperature, °C | Time, Seconds |  |
|---|---|---|
|  | EXAMPLE 5 Base Composition | Example 6 |
| 50 | 10 | 10 |
| 100 | 30 | 40 |
| 150 | 60 | 90 |
| 200 | 120 | 210 |
| Average Coating Thickness, mils | 60 | 66 |

EXAMPLES 7-11

The procedure of Examples 1-6 was used in the preparation of the intumescent compositions of Examples 7-11 whose formulations are shown in Table 5 below. Examples 7-11 are compositions which contain 4,4'-dinitrosulfanilide as the intumescent agent. The compositions of Examples 8-11 which contain an endothermic filler were prepared by adding the desired filler to the portion of the components to be blended which contained the intumescent agent. The resulting coatings were applied to cold rolled steel panels for fire testing. A coating thickness of 0.15 cm ± 0.01 (0.063 in ± 0.005) was used in each case for all time-temperature studies. All coatings were dried for one week prior to testing.

TABLE 5

INTUMESCENT-ABLATOR COATING COMPOSITIONS

| INGREDIENTS | Ex. 7 | EX. 8 | EX. 9 | EX. 10 | EX. 11 |
|---|---|---|---|---|---|
| Part A |  |  |  |  |  |
| 4,4'-dinitrosulfanilide | 26.9 | 23.5 | 29.5 | 23.5 | 19.4 |
| carboxy-terminated chlorinated polyolefin (50% solids) | 32.9 | 27.5 | 34.6 | 27.5 | 22.7 |
| epoxy | 1.0 | 0.9 | 1.1 | 0.9 | 0.8 |
| toluene | 28.8 | 29.8 | 28.0 | 29.8 | 29.5 |
| methylene chloride | 10.4 | 12.9 | — | 12.9 | 12.7 |
| potassium fluoborate | — | 5.4 | — | — | — |
| ammonium fluoborate | — | — | 6.8 | — | — |
| zinc borate | — | — | —5.4 | 4.5 | — |
| ammonium oxalate | — | — | — | — | 10.4 |
|  | 100.0 | 100.0 | 100.0 | 100.0 | 100.0 |
| Part B |  |  |  |  |  |
| Amine terminated butadiene acrylonitrile | 4.0 | 3.6 | 4.4 | 3.6 | 3.2 |
| toluene | 4.0 | 3.6 | 4.4 | 3.6 | 3.2 |
|  | 8.0 | 7.2 | 8.8 | 7.2 | 6.4 |

THERMAL ANALYSIS

In all of the differential thermal analysis determinations of the endothermic and exothermic reaction temperatures for the inorganic fillers and intumescent coatings a DuPont 990 Differential Thermal Analyzer (DTA) at a programmed scanning rate of 10° C per minute was used. A sample weight of 50 mg was used for each. The char yield ($Y_c$) remaining at 600° C was determined from a DuPont Thermogravimetric Analyzer (TGA) at a heating rate of 10° C per minute in a nitrogen atmosphere for each of the endothermic fillers and coatings.

The exothermic profiles for both 4,4'-dinitrosulfanilide and the ammonium salt of 1,4-nitroaniline-2-sulfonic acid were determined by differential thermal analysis (DTA) and the results are shown in FIG. 1. The profiles confirm a substantial release of energy during decomposition of the intumescent agents. 4,4'-Dinitrosulfanilide and the ammonium salt of 1,4-nitroaniline-2-sulfonic acid show broad exotherms ranging from 195° to 325° C and 285° to 375° C, respectively.

Figure 2:
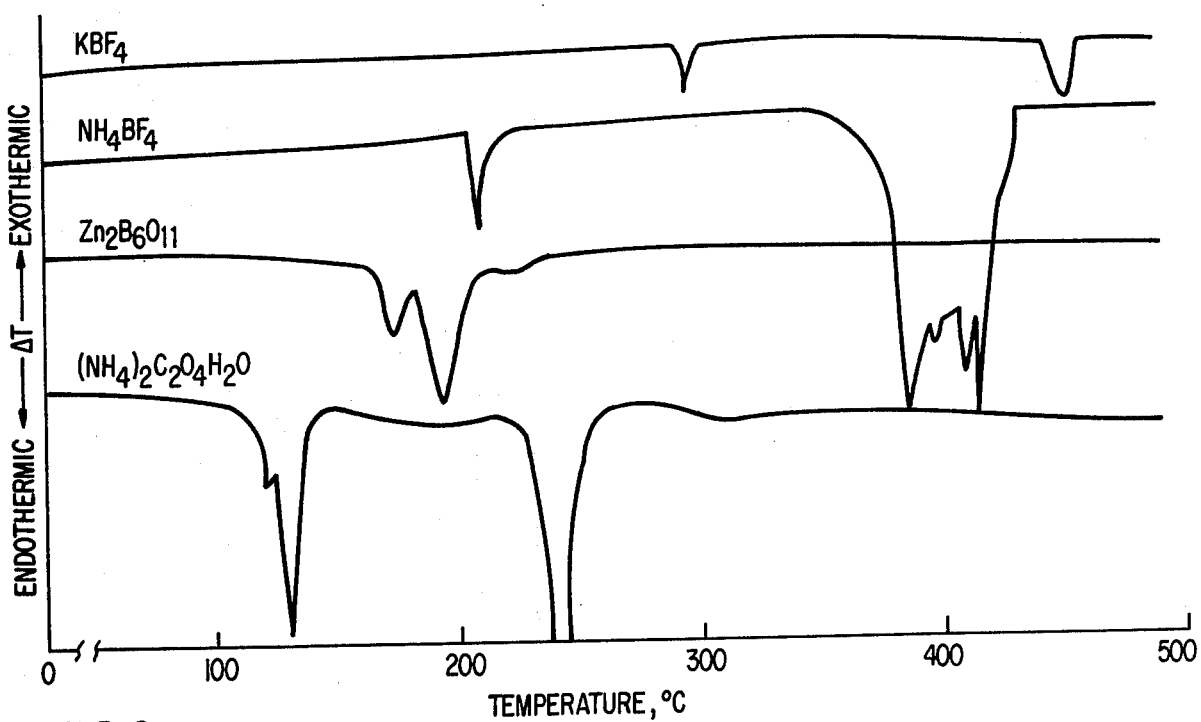
FIG. 2 shows the differential thermal anaylsis curves of specific endothermic fillers.

Differential thermal analysis of each of the fillers used in the Examples was also conducted. The results are shown in FIG. 2. Ammonium fluoborate exhibits two regions of endothermicity at about 210° C and over a broader area ranging from 385° to 415° C. Ammonium oxalate exhibits two endothermic peaks at 130° C and 240° C. Both of these compounds left no residues upon decomposition, as determined by thermogravimetric analysis. Differential thermal analysis of potassium fluoborate showed an endothermic change at 280° C and endothermic decomposition at 455° C. Thermogravimetric analysis confirmed the results of DTA and also revealed a weight fraction of 80% which remained at 600° C. Zinc borate exhibited endothermic peaks at 173° and 195° C with a weight fraction of 76% remaining at 600° C. In addition to the above characteristic all of the fillers were compatible, processable and environmentally stable at high humidities except ammonium fluoborate which is readily soluble in water.

Figure 3:
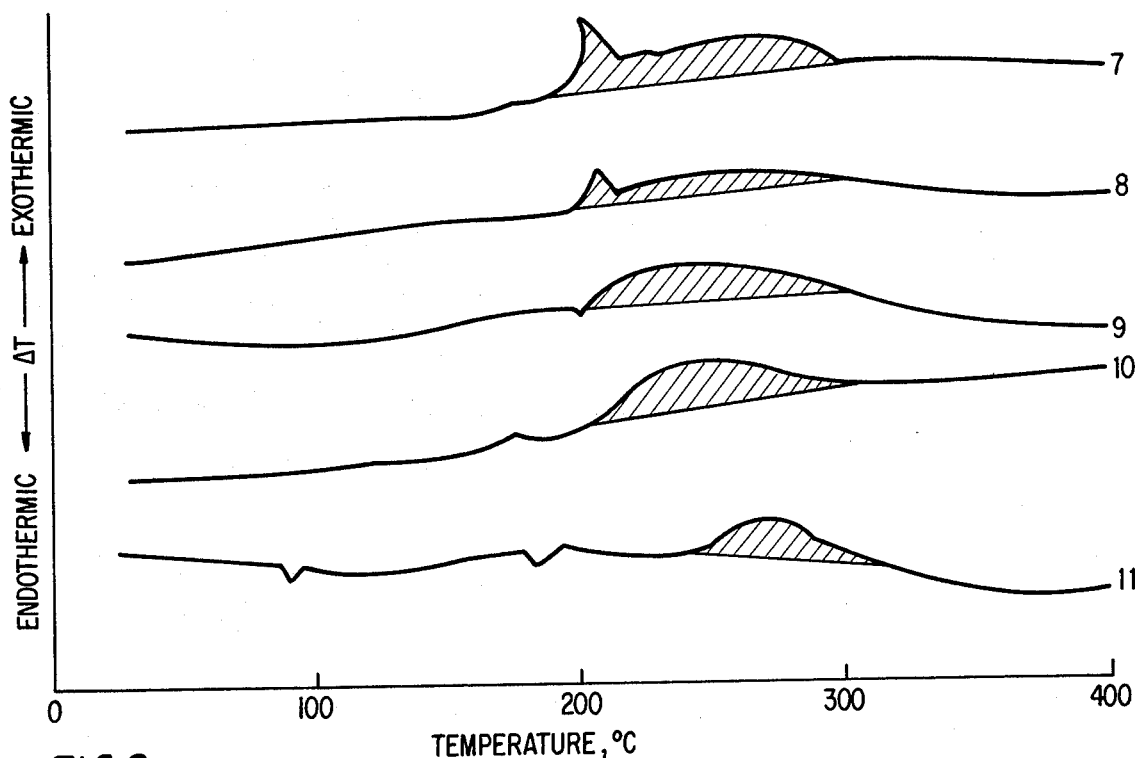
FIG. 3 shows the differential thermal analysis curves of various endothermic filler - 4,4'-dinitrosulfanilide combinations in contrast to 4,4'-dinitrosulfanilide alone.

Differential thermal analysis was also employed to determine the thermal characteristics of the compositions of Examples 5-11. FIG. 3 shows the thermal profiles for the intumescent-ablator compositions of Examples 8-11 in comparison to the thermal profile of the base intumescent composition of Example 7. The profiles indicate that for the compositions containing at least one endothermic filler, a significant reduction in exothermic energy release was achieved. The exothermic spike in the $KBF_4$ containing composition is attributable to an imperfect correlation between the endothermic region of $KBF_4$ and the exothermic region of 4,4'-dinitrosulfanilide.

Figure 4:
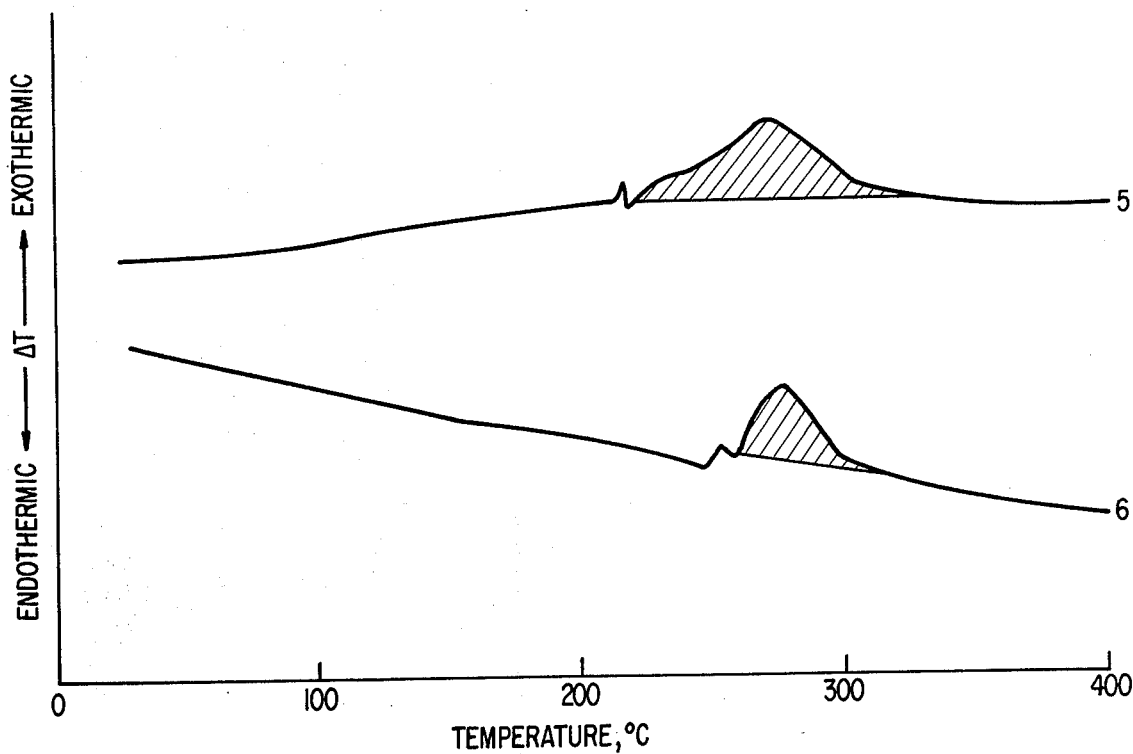
FIG. 4 shows the differential thermal analysis curves of an ammonium oxalate-ammonium salt of 1,4-nitroaniline-2-sulfonic acid combination in contrast to the ammonium salt alone.

Reference to FIG. 4 shows the effect of the endothermic filler, ammonium oxalate on the thermal properties of an ammonium salt of 1,4-nitroaniline-2-sulfonic acid containing intumescent composition. A comparison of the curve of the composition of Example 6 with the curve of Example 5 shows a reduced exothermic region for the ammonium oxalate containing composition in comparison to the non-filler containing composition.

The char stability properties of the present intumescentablator composition were investigated as shown by the data in Table 6. The steel panels coated with the compositions of Examples 5-11 were subjected to thermogravimetric analysis under anerobic conditions. The char yield of each coated panel was determined at 600° because this temperature is beyond the decomposition temperatures of the components of the intumescent compositions so that it could be determined whether any interaction has occurred which would affect the ultimate char stability of the intumescent-ablator compositions. The experimental char yields obtained are compared to the calculated char yields as shown in Table 6. The relative close agreement between the experimental and calculated char values indicates that an additive effect exists for each intumescent-ablator coating system investigated.

TABLE 6

| EFFECT OF ABLATIVE FILLERS ON CHAR YIELD (Yc) | | | | |
|---|---|---|---|---|
| Coating | Filler | Filler Yc, 600° C | Coating Yc, Calc. | 600° C MEAS. |
| 7 | — | — | — | 40.0 |
| 8 | $KBF_4$ | 80.0 | 44.5 | 43.5 |
| 9 | $NH_4BF_4$ | 2.0 | 35.4 | 34.5 |
| 10 | $Zn_2B_6O_{11}$ | 76.0 | 44.1 | 47.0 |
| 11 | $Zn_2B_6O_{11}/(NH_4)_2C_2O_4H_2O$ | 25.0 | 35.5 | 32.0 |
| 5 | — | — | — | 44.0 |
| 6 | $(NH_4)_2C_2O_4H_2O$ | 0 | 38.9 | 38.0 |

NOTE
All coatings contained 11.4% filler on dry weight basis except Ex. 11 which contained 30%.

JP-4 FUEL FIRE TEST

All experimental data for the time-temperature histories of the base intumescent compositions and the intumescent-ablator compositions were obtained from the NASA T-3 Fire Test Facility. The facility used consisted of a JP-4 fuel-fired furnace whose heat flux level was determined from the radiant energy of the furnace itself. A heat flux of 110-120 kilowatts/$m^2$ was the flux level employed. The time-temperature histories of the intumescent-ablator coatings were obtained by measuring the backfire temperature rise of the steel substrate as a function of time. Each time-temperature plot was obtained from an average of three or more independent determinations.

Figure 5:
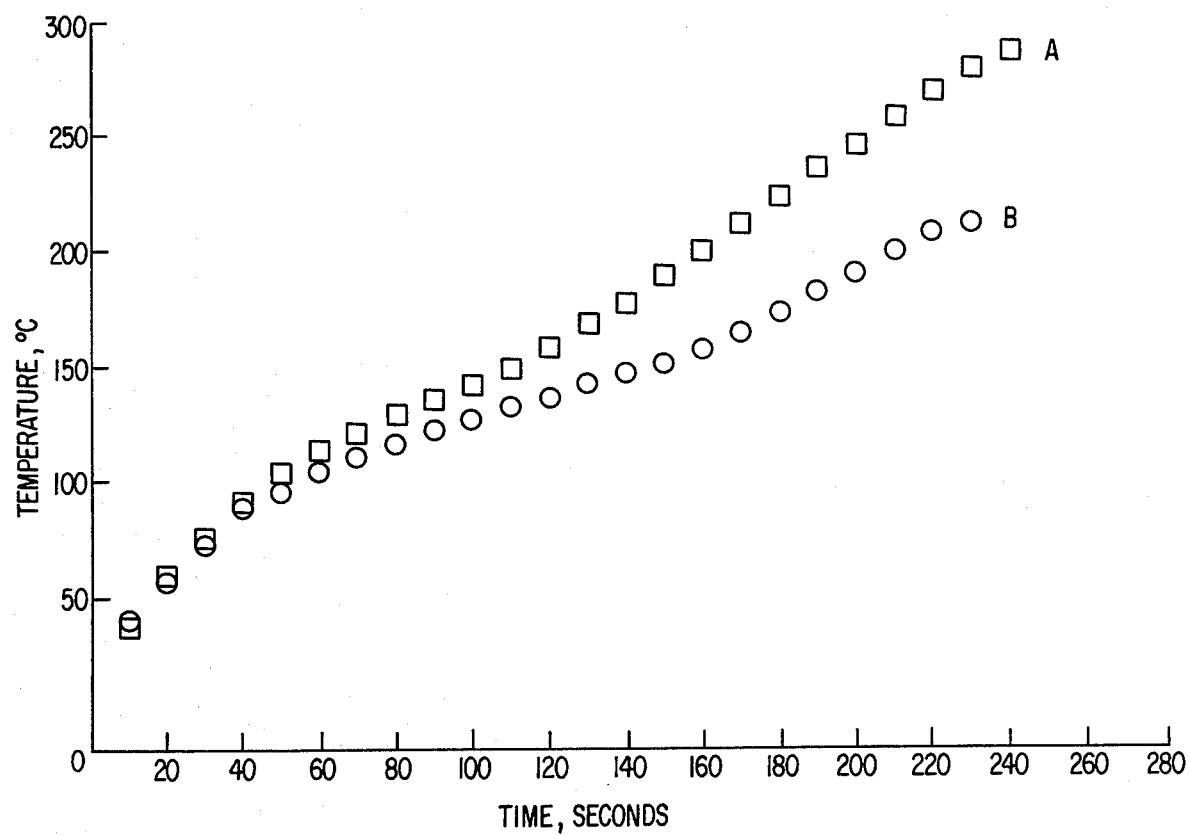
FIG. 5 contrasts the time-temperature profiles of steel panels coated with an intumescent composition containing $KBF_4$ as an endothermic filler and the same composition which lacks an endothermic filler.

Steel panels which were coated with the compositions of Examples 5-11 were exposed to a JP-4 fuel fire at a controlled heat flux. The purpose of the test was to obtain time-temperature histories of the backface temperature rise in the coated substrates as a measure of the effectiveness of the endothermic filler containing compositions in reducing or controlling the temperature rise of the substrate in comparison to the base compositions which do not contain a filler. All of the tests indicated that the presence of an endothermic filler component in the base compositions results in a reduction in the temperature rise experienced by the substrate. FIG. 5 is representative of the results obtained and provides a comparison (Example 7) of a base composition containing a 4,4'-dinitrosulfanilide intumescent agent (Curve A) with a very similar composition containing the endothermic filler, $KBF_4$. The reduced temperature experienced by the substrate demonstrates the endothermic properties of the filler in the intumescent composition.

Having now fully described this invention, it will be apparent to one of ordinary skill in the art that many changes and modifications can be made thereto without departing from the spirit or scope of the invention as set forth herein.

What is claimed as new and intended to be secured by Letters Patent is:

1. An intumescent-ablator coating composition which comprises:
   an intumescent agent, a binder system, and an endothermic filler having a decomposition temperature about or within the exothermic temperature region of the intumescent agent, said filler being present in a quantity ranging from about 5 to 30% of the combined weight of said intumescent agent and binder system.

2. The composition of claim 1, wherein said filler is potassium fluoborate, ammonium oxalate, zinc borate, ammonium fluoborate or mixtures thereof.

3. The composition of claim 1, wherein said intumescent agent is 4,4'-dinitrosulfanilide or the ammonium salt of 1,4-nitroaniline-2-sulfonic acid.

4. The composition of claim 1, wherein said intumescent composition comprises from 20% to 70 weight % 4,4'-dinitrosulfanilide, from 0.5 to 2.0 weight % of a bisphenol A epoxy having the formula:

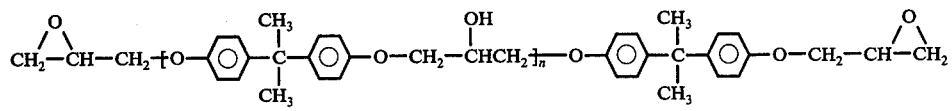

wherein n has a value such that the epoxy has a viscosity of 100-160 poises and an epoxide equiva-

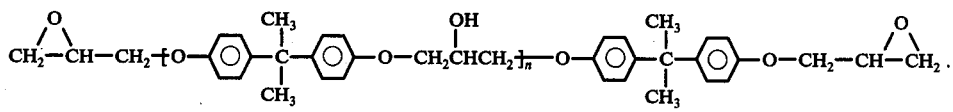

lent weight of 185-192, an amount of amine sufficient to cross-link and harden said epoxy, and from 15-60 wt. % of a carboxy-terminated chlorinated polyolefin having the formula:

wherein the ratio of y/x provides a chlorine content of 58-62 weight percent.

5. The composition of claim 1, wherein said intumescent composition comprises the ammonium salt of 1,4-nitroaniline-2-sulfonic acid in an epoxy-polysulfide binder.

6. The composition of claim 1, wherein said admixture is dissolved in an organic solvent of benzene, xylene, toluene or methylene chloride.

7. An intumescent-ablator coating composition, which comprises:
from 5 weight percent to 30 weight percent, based on the total weight of said intumescent-ablator composition, of an endothermic filler having a decomposition temperature about or within the exothermic region of the intumescent agent, said filler being selected from the group consisting of ammonium oxalate, ammonium fluoroborate, zinc borate, potassium fluoborate, and mixtures thereof, with an intumescent composition containing from 20 to 70 weight percent 4,4'-dinitrosulfanilide, from 0.5 to 2.0 weight % of a bisphenol A epoxy having the formula:

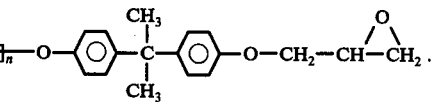

wherein n has a value such that the epoxy has a viscosity of 100-160 poises and an epoxide equivalent weight of 185-192, an amount of amine sufficient to cross-link and harden said epoxy resin, and from 15-60 wt % of a carboxy-terminated chlorinated polyolefin having the formula:

wherein the ratio of y/x provides a chlorine content of 58-62 weight percent.

8. A method of protecting a substrate with an intumescent-ablator composition, which comprises:
coating said substrate with an intumescent-ablator composition comprising an intumescent agent, a polymeric binder system, and an endothermic filler having a decomposition temperature about or within the exothermic temperature region of the intumescent agent, said filler being present in a quantity ranging from about 5 to 30% of the combined weight of said intumescent agent and binder system.

9. The method of claim 8, wherein said intumescent-ablator composition is applied as a coating of 20 to 100 mils thickness.

10. The method of claim 8, wherein said endothermic filler is ammonium oxalate, zinc borate, potassium fluoborate or ammonium fluoborate.

* * * * *